United States Patent
Kim et al.

(10) Patent No.: US 7,966,040 B2
(45) Date of Patent: Jun. 21, 2011

(54) MAGNETICALLY ATTACHABLE ACCESSORIES FOR A MOBILE UNIT

(75) Inventors: Sunmee Kim, Forest Hills, NY (US); Thomas K. Roslak, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 894 days.

(21) Appl. No.: 11/937,227

(22) Filed: Nov. 8, 2007

(65) Prior Publication Data
US 2009/0122497 A1 May 14, 2009

(51) Int. Cl.
*H04B 1/38* (2006.01)
(52) U.S. Cl. ........... 455/557; 455/550.1; 455/556.1; 455/556.2
(58) Field of Classification Search ........ 455/550.1–559
See application file for complete search history.

(56) References Cited

U.S. PATENT DOCUMENTS

| | | | |
|---|---|---|---|
| 4,669,109 A * | 5/1987 | Le Cheviller et al. | 379/143 |
| 5,260,697 A * | 11/1993 | Barrett et al. | 345/173 |
| 5,463,742 A * | 10/1995 | Kobayashi | 710/303 |
| 5,550,452 A * | 8/1996 | Shirai et al. | 320/108 |
| 5,857,148 A * | 1/1999 | Weisshappel et al. | 455/575.3 |
| 5,936,614 A * | 8/1999 | An et al. | 345/173 |
| 6,007,363 A * | 12/1999 | Renk | 439/378 |
| 6,230,029 B1 * | 5/2001 | Hahn et al. | 455/575.2 |
| 6,236,868 B1 * | 5/2001 | Lygas | 455/569.2 |
| 6,295,372 B1 * | 9/2001 | Hawkins et al. | 382/187 |
| 6,603,959 B1 * | 8/2003 | Peiker | 455/575.1 |
| 6,784,873 B1 * | 8/2004 | Boesen et al. | 345/173 |
| 7,003,316 B1 * | 2/2006 | Elias et al. | 455/556.1 |
| 7,071,917 B2 * | 7/2006 | Kori | 345/157 |
| 7,633,263 B2 * | 12/2009 | Toya | 320/108 |
| 2002/0195997 A1 * | 12/2002 | Peek et al. | 320/134 |
| 2003/0030530 A1 * | 2/2003 | Reinhard et al. | 336/182 |
| 2003/0117375 A1 * | 6/2003 | Suda | 345/169 |
| 2004/0004602 A1 * | 1/2004 | Cheng et al. | 345/169 |
| 2004/0127262 A1 * | 7/2004 | Ohno | 455/566 |
| 2004/0212595 A1 * | 10/2004 | Zhou | 345/168 |
| 2005/0138437 A1 * | 6/2005 | Allen et al. | 713/300 |
| 2005/0274786 A1 * | 12/2005 | Hwang et al. | 235/145 R |
| 2006/0098666 A1 * | 5/2006 | Francis Conde Powell | 370/401 |
| 2006/0116184 A1 * | 6/2006 | Hayashi | 455/575.8 |
| 2007/0079030 A1 * | 4/2007 | Okuley et al. | 710/62 |
| 2007/0230227 A1 * | 10/2007 | Palmer | 363/78 |
| 2008/0291225 A1 * | 11/2008 | Arneson | 345/698 |
| 2008/0317021 A1 * | 12/2008 | Ives et al. | 370/389 |
| 2009/0033627 A1 * | 2/2009 | Aasen | 345/168 |
| 2009/0100732 A1 * | 4/2009 | Seidler | 40/729 |

* cited by examiner

*Primary Examiner* — Kent Chang
*Assistant Examiner* — Ronald Eisner

(57) ABSTRACT

A mobile unit comprises a housing and a processor. The housing includes a frame configured to magnetically couple with an accessory. When the frame and the accessory are magnetically coupled, data signals and power are exchanged between the mobile unit and the accessory via a wireless communication where the wireless communication includes at least one of an inductive coupling, a capacitive coupling and an optical coupling. The processor is disposed within the housing to process the data signals and control the power being exchanged between the mobile unit and the accessory.

9 Claims, 10 Drawing Sheets

MAGNETICALLY ATTACHABLE ACCESSORIES FOR A MOBILE UNIT

FIELD OF THE INVENTION

The present invention relates generally to magnetically attachable accessories for a mobile electronic unit. Specifically, accessories may magnetically connect to a portion of the mobile unit so that power and data signals may be exchanged, thereby adding a functionality to the mobile unit.

BACKGROUND

A mobile unit (MU) technology has improved to provide a much larger display in contrast to displays of prior MU technologies. However, an overall size of the MU is still small enough to be, for example, handheld. Consequently, a majority of the outer peripheral area of the MU may be occupied by the display. Disadvantageously, functionalities that the MU may be capable of executing may be required to be sacrificed so that the larger display may be disposed. In addition, the MU may be required to include multiple connectors or ports to receive accessories. The connectors or ports may be problematic, resulting in poor performance or intermittent operation. The connectors or ports may also be prone to damage that may result in a user being unable to utilize the connector or port or be required to service the entire MU, which may be highly invasive.

SUMMARY OF THE INVENTION

The present invention relates to a mobile unit comprising a housing and a processor. The housing includes a frame configured to magnetically couple with an accessory. When the frame and the accessory are magnetically coupled, data signals and power are exchanged between the mobile unit and the accessory via a wireless communication where the wireless communication includes at least one of an inductive coupling, a capacitive coupling and an optical coupling. The processor is disposed within the housing to process the data signals and control the power being exchanged between the mobile unit and the accessory.

DETAILED DESCRIPTION

Figure 1:
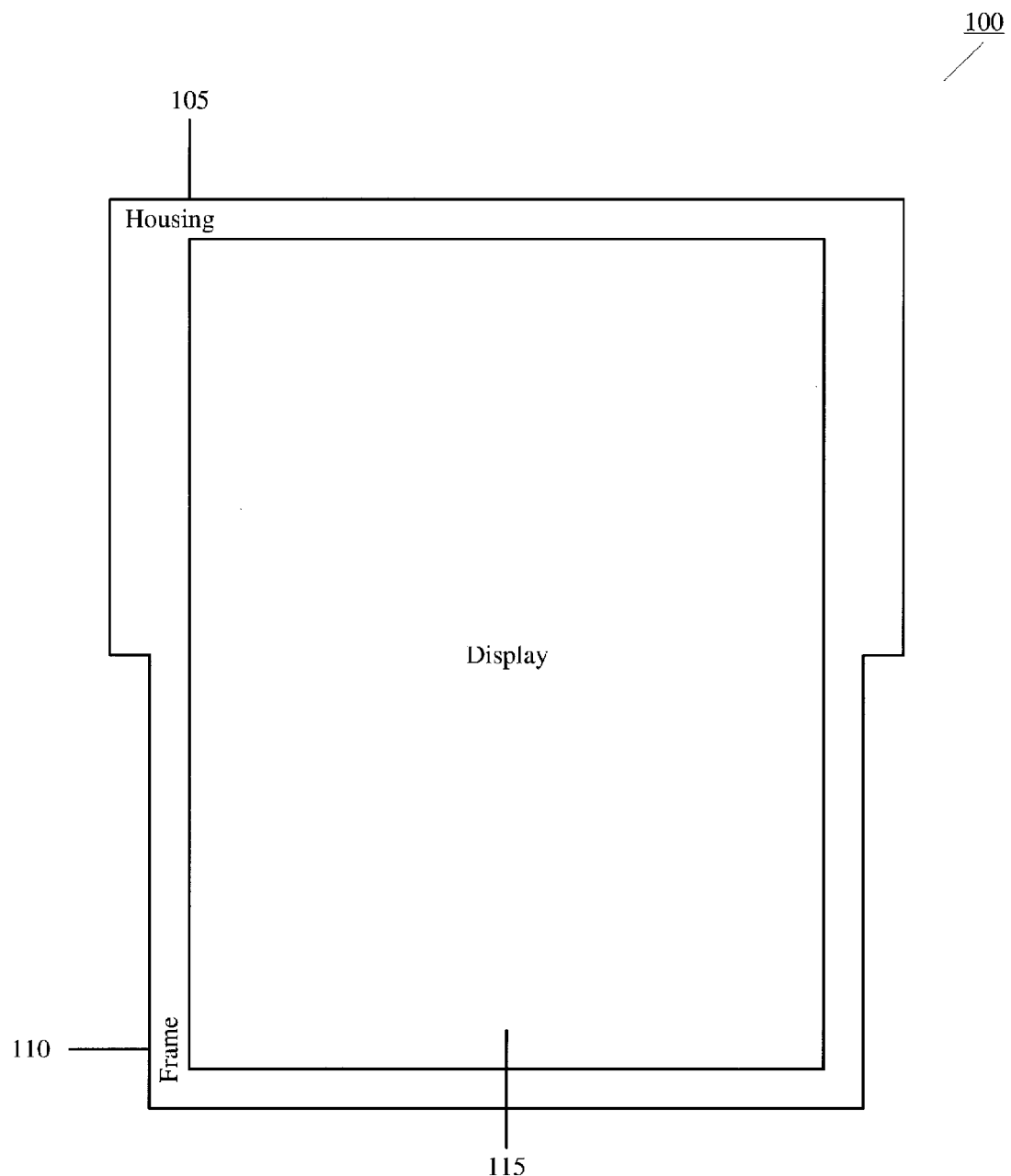
FIG. 1 shows a first view of an exemplary mobile unit according to an exemplary embodiment of the present invention.

The exemplary embodiments of the present invention may be further understood with reference to the following description and the appended drawings, wherein like elements are referred to with the same reference numerals. The exemplary embodiments of the present invention describe magnetically attachable accessories for a mobile unit (MU). As will be described in detail below, the MU and the accessory may be configured to couple magnetically so that an exchange of power and data signals may be accomplished through, for example, inductive circuit coupling. The accessory coupling to the MU may provide an additional functionality and/or interface. It should be noted that the use of the MU is only exemplary. That is, the exemplary embodiments of the present invention may be applied to any electronic device that may be coupled to an accessory. The MU, the accessory, and the coupling will be discussed in more detail below.

FIG. 1 shows an MU 100 according to an exemplary embodiment of the present invention. The MU 100 may be any portable electronic device that utilizes a portable power supply (e.g., battery, capacitor, super capacitor, etc.). The MU 100 may be, for example, a handheld terminal, a laptop, a pager, a cell phone, a scanner, an radio frequency identification reading (RFID) device, a multimedia device, etc. It should again be noted that the use of the MU 100 is only exemplary. That is, the exemplary embodiments of the present invention may apply to any electronic device (e.g., mobile or non-mobile) that is capable of coupling to an accessory. The MU 100 may be an integrated unit. As shown in FIG. 1, the MU 100 may include a housing 105, a frame 110, and a display 115.

The housing 105 may be a casing in which components of the MU 100 may be at least partially disposed. As will be discussed in detail below, the MU 100 may include at least one electronic component disposed within the housing 105. In addition, the MU 100 may include at least one component that is partially disposed on the housing 105. That is, a portion of the component may be disposed partially within the housing 105 while another portion of the component may be disposed on a periphery of the housing 105 such as the display 115. If the MU 100 is integrated, the housing 105 may be substantially permanently sealed.

According to the exemplary embodiments of the present invention, the housing 105 may be manufactured to exhibit a specific shape. Specifically, the housing 105 may include the frame 110. The frame 110 may be a portion of the housing 105 that is exposed. That is, the frame 110 may be the area of the housing 105 that partially comprises the outer periphery of the MU 100. The frame 110 may provide the shape of the MU 100. Specifically, the shape of the MU 100 may include a longer top half with a shorter bottom half. As illustrated, the top half and the bottom half may include a substantial L-shape indentation on each side of the MU 100. The substantial L-shape indentation may be disposed on a substantial midpoint of the sides of the MU 100. The frame 110 and a function of the shape of the frame 110 will be discussed in further detail below.

In a first exemplary embodiment, the frame 110 may be a ferro-magnetic so that a magnet may be attracted. As will be discussed in detail below, the accessory that couples to the MU 100 may include magnets that magnetically connect to the frame 110. The ferro-magnetic properties may be disposed in predetermined areas of the frame 110. For example, the frame 110 may be ferro-magnetic along a bottom side of the MU 100. The frame 110 may also be ferro-magnetic along sides of the bottom half of the MU 100. In a second exemplary embodiment, the frame 110 may include magnets disposed in predetermined areas. The magnets may be disposed in substantially similar areas as the areas with ferro-magnetic properties.

The display 115 may provide a user interface. Specifically, the user interface may be a graphical user interface (GUI). According to the exemplary embodiments, the display 110 may be a color touch screen that enables a user to enter inputs thereon. Thus, the display 115 may provide a data input arrangement such as a keypad in which a user may enter various inputs. The inputs may correspond to at least one installed program or functionality of the MU 100. It should be noted that the MU 100 may include further keypads disposed on other sides of the housing 105 such as a side data input arrangement (e.g., on/off switch, volume control, etc.).

Figure 2:
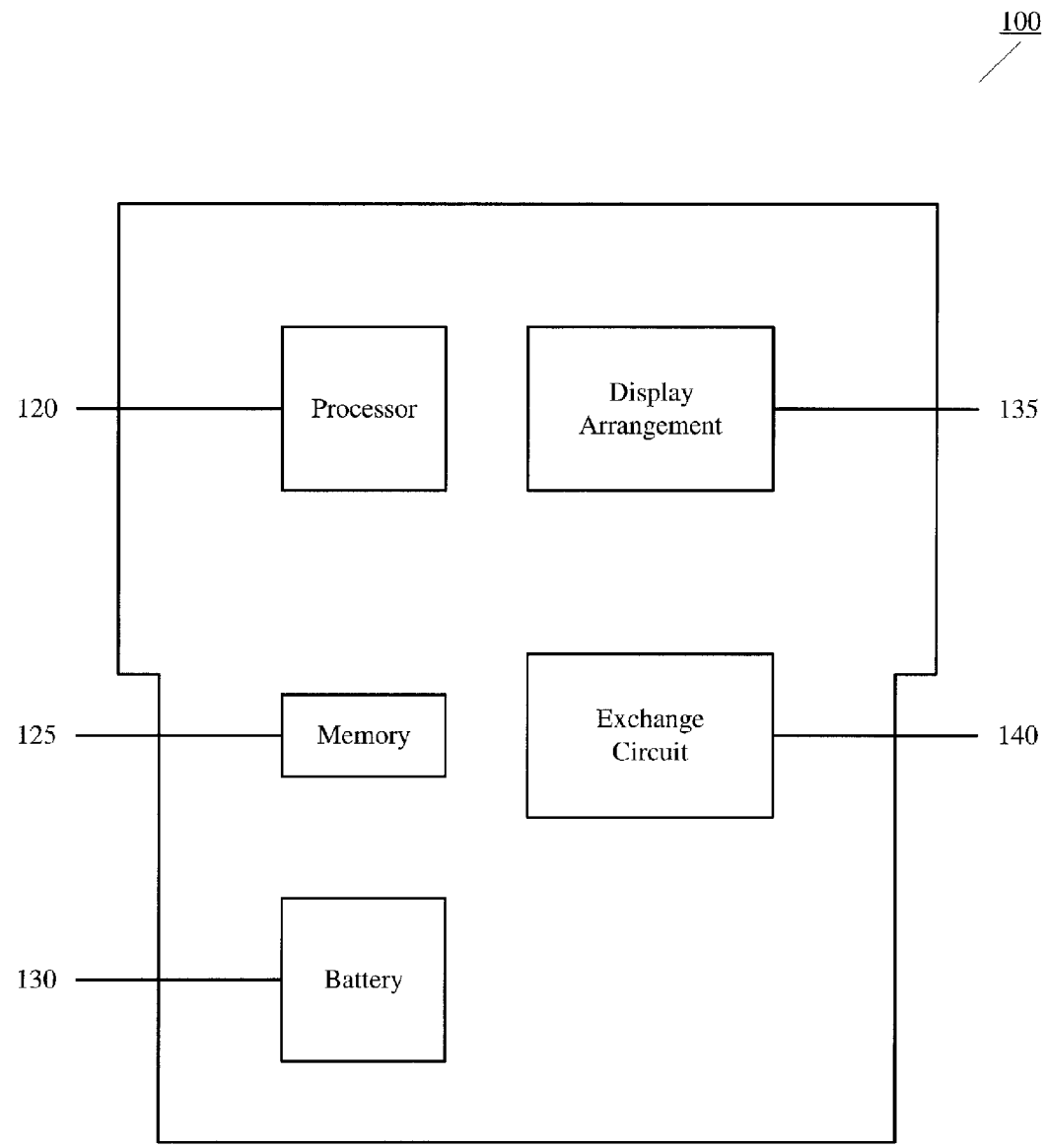
FIG. 2 shows exemplary components of the mobile unit of FIG. 1 according to an exemplary embodiment of the present invention.

FIG. 2 shows exemplary components of the MU 100 of FIG. 1 according to an exemplary embodiment of the present invention. Specifically, the components of the MU 100 which may include a processor 120, a memory 125, a battery 130, a display arrangement 135, and an exchange circuit 140 may be disposed within the housing 105. It should be noted that the components illustrated in FIG. 2 are not necessarily to scale with respect to the housing 105.

The processor 120 may be a central computing component that operates the MU 100. The memory 125 may store data related to the MU 100. The data may pertain to programs installed on the MU 100, functionalities associated with the MU 100, etc. In addition, as will be discussed below, the data may also include configuration data relating to accessories that couple to the MU 100. Specifically, the configuration data may indicate how the display 115 is to be re-configured when a specific accessory is coupled to the MU 100.

The battery 130 may be a portable power supply that provides energy to the MU 100. As discussed above, the MU 100 may be any electronic device that utilizes a portable power supply. The battery 130 may be a rechargeable battery such as a nickel cadmium (Ni—Cd), a nickel hydride (Ni—H), a lithium ion, etc. It should be noted that the battery 130 may be removed from the housing 105 of the MU 100. While removed, the battery 130 may be recharged separately from the MU 100. Accordingly, the housing 105 may include a lid or door that may be opened to provide an access to the battery 130.

The display arrangement 135 may be a circuitry that controls the display 115. The display arrangement 135 may receive data from the processor 120 and create a visual corresponding to the data which is shown on the display 115. The display arrangement 135 may also be configured to transmit data to the processor corresponding to any touch inputs that are received via the display 115.

According to the exemplary embodiments of the present invention, the MU 100 may include the exchange circuit 140 to provide data relating to the accessory. Therefore, the exchange circuit 140 may be at least indirectly coupled to the frame 110. As discussed above, the frame 110 may be at least partially ferro-magnetic. Thus, the areas of the frame 110 that are ferro-magnetic may be coupled to the exchange circuit 140 as these areas may be responsible for the coupling of the accessory to the MU 100. Furthermore, the exchange circuit 140 may be responsible for the exchange of data and/or power signals between the MU 100 and the accessory. The exchange circuit 140 will be discussed in further detail below. It should be noted that the exchange circuit 140 being disposed as a separate unit is only exemplary. The exchange circuit 140 may also be a function of the processor 120.

Figure 3A:
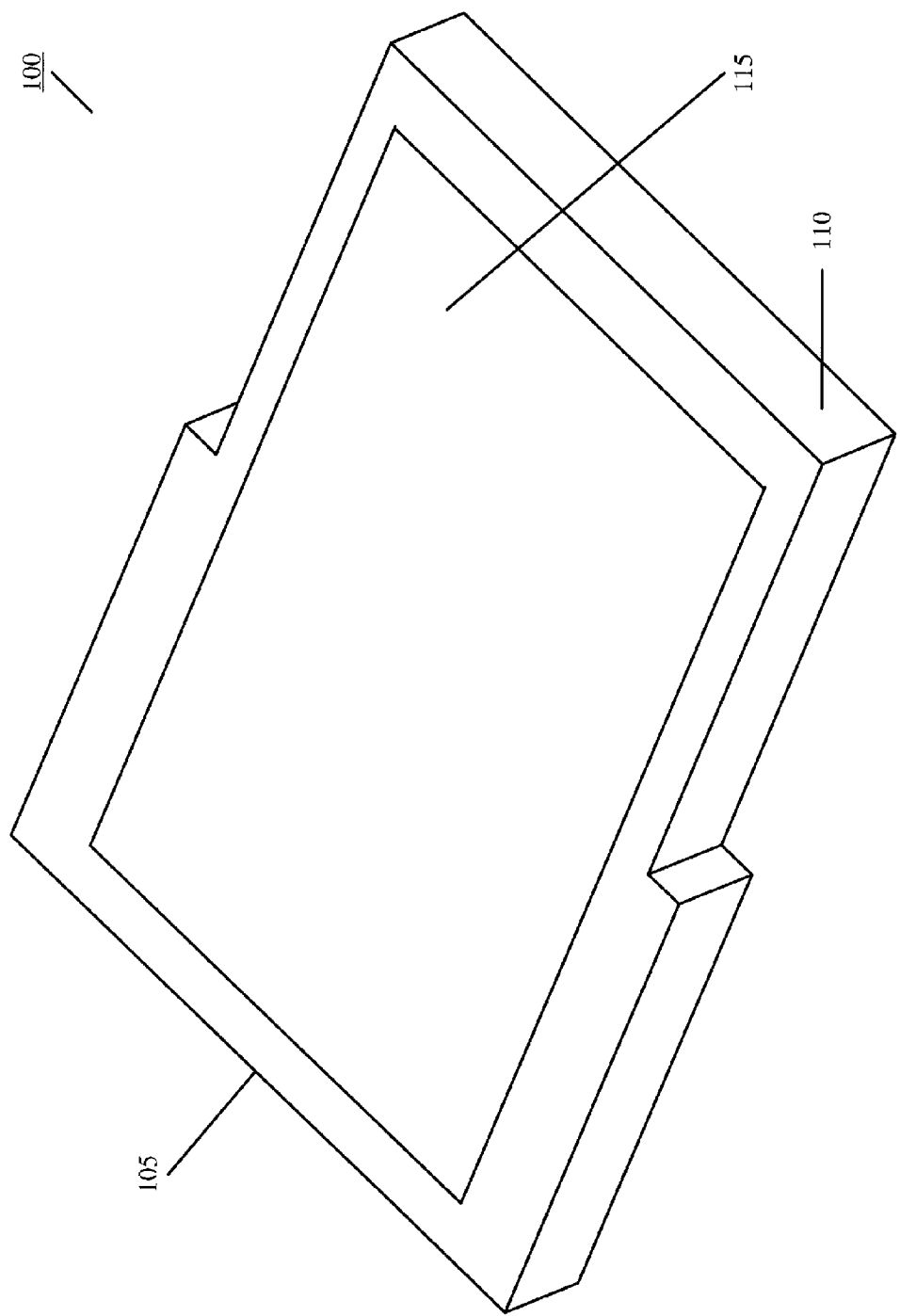
FIG. 3a shows a second view of the exemplary mobile unit of FIG. 1 according to an exemplary embodiment of the present invention.

FIG. 3a shows another exemplary embodiment of the MU 100 according to the present invention. Specifically, FIG. 3a shows an angled perspective view of the MU 100. The MU 100 has the substantially L-shaped indentation between the top half and the bottom half of the MU 100. Thus, a lateral length of the top half may be longer than a lateral length of the bottom half.

As will be discussed below, the substantially L-shaped indentation may provide an overall shape of the MU 100 that is receptive for the coupling of the accessory. However, it should be noted that the MU 100 including the substantially L-shaped indentation on both sides of the housing 105 is only exemplary. That is, the MU 100 may include sides that extend substantially parallel from the top side to the bottom side of the MU 100.

Figure 3B:
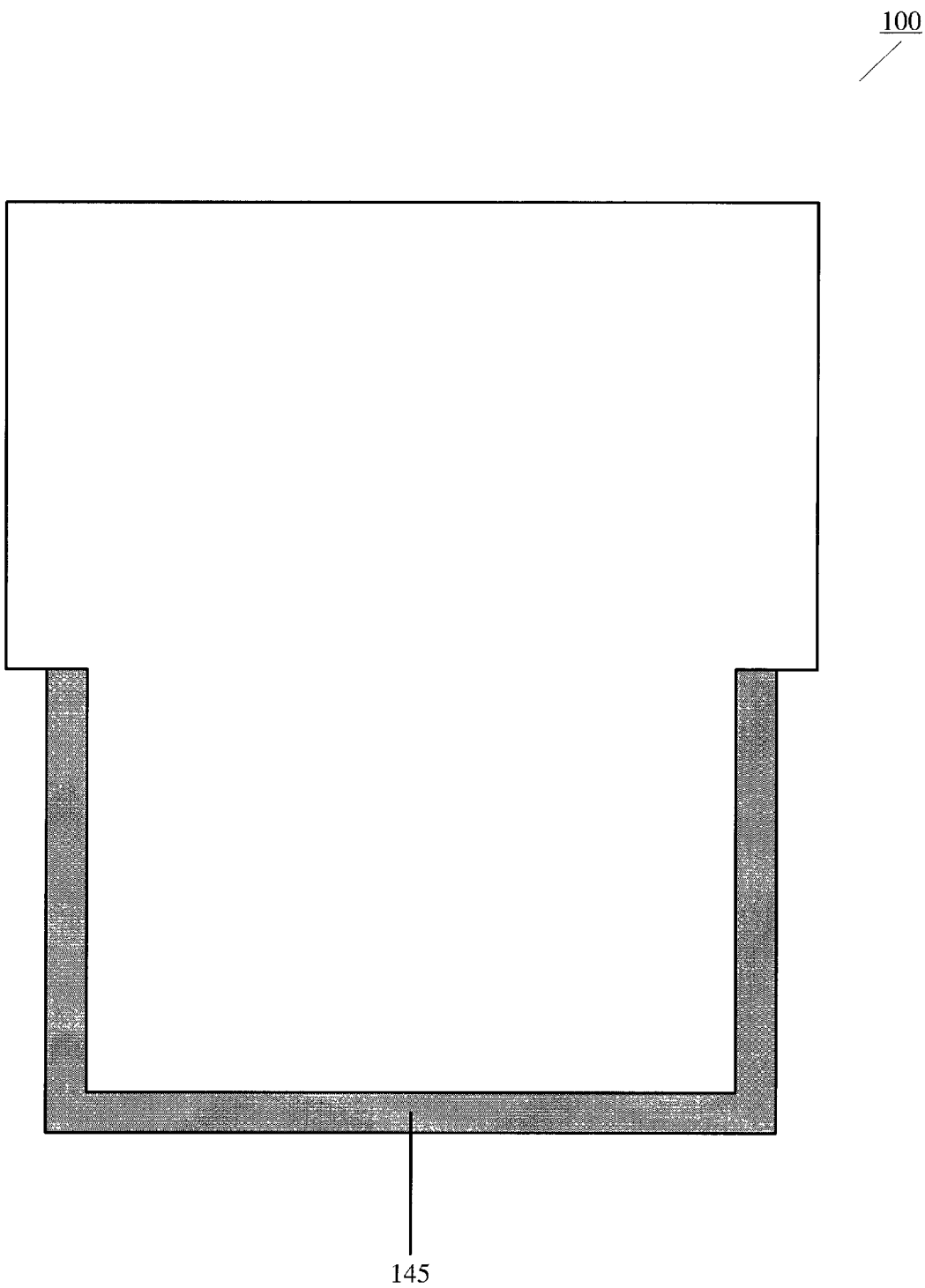
FIG. 3b shows further exemplary components of the mobile unit of FIG. 1 according to an exemplary embodiment of the present invention.

FIG. 3b shows further exemplary components of the MU 100 of FIG. 1 according to an exemplary embodiment of the present invention. As discussed above, the frame 110 may include ferro-magnetic areas and/or magnets to couple to an accessory. The area 145 of the MU 100 may be disposed around a periphery of the frame 110. The area 145 may be where the ferro-magnetic areas and/or the magnets may be disposed. As will be discussed below, the area 145 may be a location where the accessory is to couple to the MU 100. It should be noted that in a first exemplary embodiment, the entire area 145 may be ferro-magnetic. In other exemplary embodiments, predetermined areas of the area 145 may be ferro-magnetic. In a substantially similar manner, the entire area 145 may be include magnets or predetermined areas of the area 145 may include magnets.

Figure 4A:
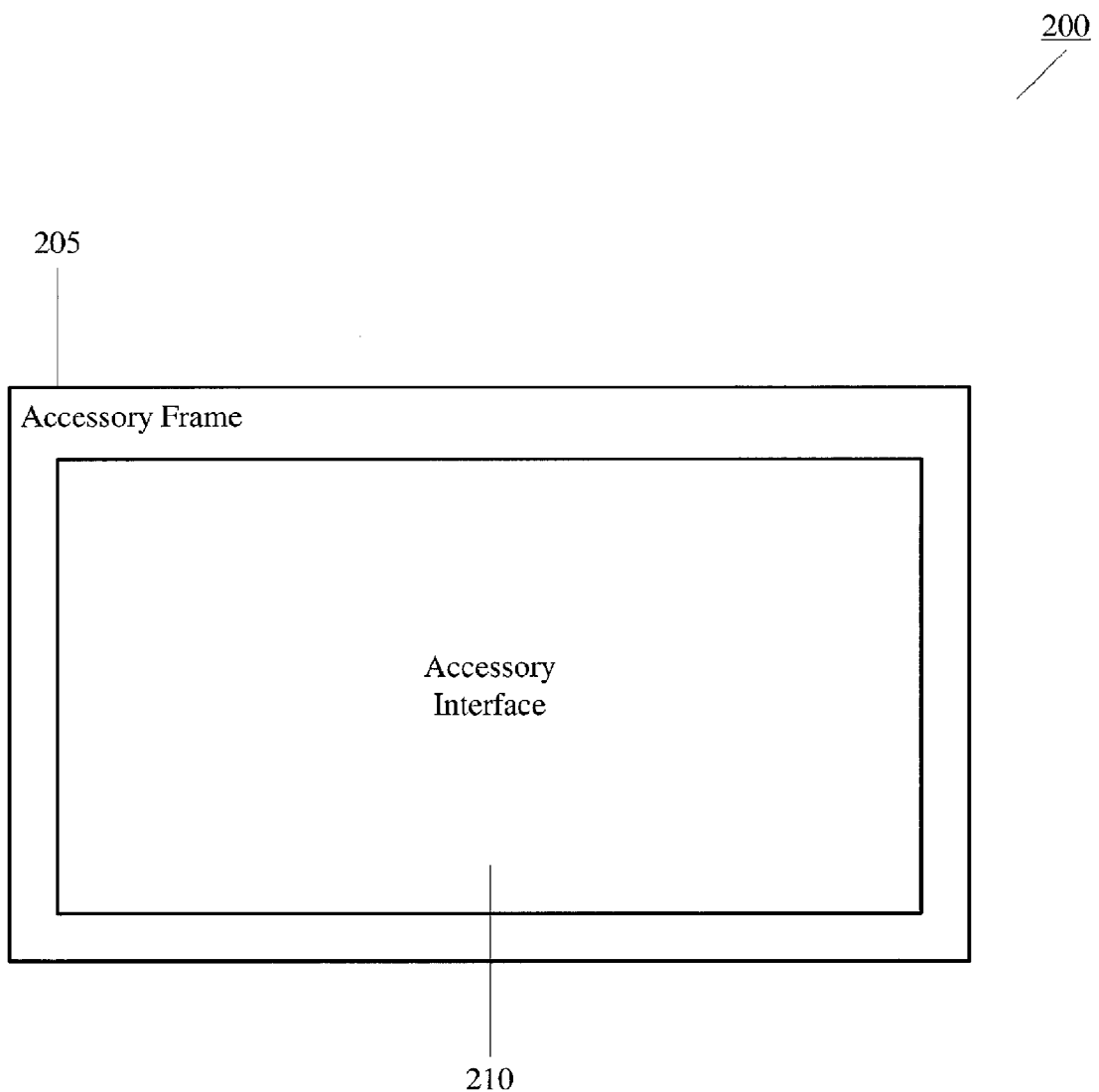
FIG. 4a shows a first view of an exemplary accessory according to an exemplary embodiment of the present invention.

FIG. 4a shows an exemplary embodiment of an accessory 200 according to the present invention. As discussed above, the accessory 200 may be any attachment that couples to the MU 100. For example, the accessory 200 may be a key pad. The key pad may include a plurality of keys that enables a user to depress a key in order to enter a respective input. The key pad may eliminate or supplement a need for the display 115 to act as the data input arrangement (e.g., touch panel). However, the key pad may additionally provide an input mechanism working with the display 115 that is a touch panel. The accessory 200 may include an accessory frame 205 and an accessory interface 210.

The accessory frame 205 may enable the coupling of the accessory 200 to the MU 100. The accessory frame 205 may be manufactured to exhibit a shape that substantially corresponds to a shape of the frame 110 of the MU 100. That is, the accessory frame 205 may be designed to substantially fit over the frame 110. Thus, an inner area of the accessory frame 205 may be substantially similar to an outer area of the frame 110. In addition, when the accessory 200 is coupled to the MU 100, the accessory frame 205 may be disposed over a partial area of the display 115. However, it should be noted that the accessory frame 205 being disposed over a partial area of the display 115 is only exemplary. That is, depending on the accessory 200, the display 115 may or may not be partially covered.

As discussed above, the frame 110 may include predetermined areas that are ferro-magnetic. Because the accessory 200 couples to the MU 100, in a first exemplary embodiment of the accessory frame 205 that corresponds to the first exemplary embodiment of the frame 110 described above with reference to FIG. 1, the accessory frame 205 may include magnets that are attracted to the ferro-magnetic areas of the frame 110. In this manner, the accessory 200 may be magnetically coupled to the MU 100. Furthermore, the magnetic coupling may also provide an inductive circuit coupling to be established. In a second exemplary embodiment of the accessory frame 205 that corresponds to the second exemplary embodiment of the frame 110 described above with reference to FIG. 1, the accessory frame 205 may include oppositely polarized magnets that are attracted to the magnets of the frame 110. In this manner, a strong magnetic coupling may be established between the accessory 200 and the MU 100. This magnetic coupling may also provide the inductive circuit coupling to be established. The inductive circuit coupling will be described in further detail below.

It should be noted that the use of an inductive circuit coupling is only exemplary. That is, when the accessory 200 couples to the MU 100, any wireless communication may be used for exchanging the data signals and/or power between the accessory 200 and the MU 100. The wireless communication may include, for example, the inductive coupling discussed above, a capacitive coupling, an optical coupling, and a combination thereof. Furthermore, with the other types of couplings, the magnets and/or ferro-magnetic areas may serve solely to couple the accessory 200 to the MU 100. Other components may be used to establish, for example, the capacitive coupling or the optical coupling. Thus, the magnets may not be involved in the exchange of data signals and/or power.

Furthermore, it should be noted that the accessory 200 magnetically coupling to the MU 100 is only exemplary. Specifically, the magnets directly coupling the accessory 200 to the MU 100 is only exemplary. In yet another embodiment, the magnetic coupling may be indirectly responsible for the coupling of the accessory 200 to the MU 100. For example, the magnets and/or ferro-magnetic areas may be used to secure an interlocking mechanical interface. The mechanical interface may be non-latching so that no extraneous components are disposed on a periphery of the accessory 200 and/or the MU 100. In another example, when the magnets of the accessory 200 are properly aligned with the MU 100, the magnetic coupling may trigger a solenoid to activate. The solenoid may be part of the mechanical interface that couples the accessory 200 to the MU 100.

The accessory interface 210 may be provided to enable a user to utilize the functionality that the accessory 200 provides. For example, when the accessory 200 is a key pad, the accessory interface 210 may be the plurality of keys. It should be noted that the accessory interface 210 being included with the accessory 200 is only exemplary. That is, depending on the functionality provided by the accessory 200, the accessory interface 210 may be unnecessary. For example, the MU 100 may not be equipped with a communications arrangement such as a transceiver. The accessory 200 may be the communications arrangement. However, the communications arrangement may not require a user interaction. That is, for example, the communications arrangement may be configured through the MU 100.

The accessory 200 may be other types of modules that magnetically couple to the MU 100. As discussed above, two exemplary embodiments of the accessory 200 include a key pad and a transceiver. The key pad may be, for example, a numeric key pad, a QWERTY format key pad, an alphanumeric key pad, etc.

In a third exemplary embodiment according to the present invention, the accessory 200 may be a biometric module. For example, the biometric module may provide the MU 100 with a biometric measuring functionality. In a first example, the biometric module may be a capacitance or radio frequency reader for fingerprints. The accessory interface 210 in this example may be a fingerprint pad. The fingerprint pad may be used to authenticate a user prior to use of the MU 100.

In a fourth exemplary embodiment according to the present invention, the accessory 200 may be a scanning module. The scanning module may include a scanning engine and a scanning window in which a line of sight is created from the scanning engine. The scanning module may include a trigger as the accessory interface 210 to activate the scanning engine to perform a scan. It should be noted that the scanning module may be any type of data capture device. For example, the scanning module may be for a laser imager or a scanner for scanning barcodes (e.g., one-dimensional, two-dimensional, color, etc.), an imager for capturing images, a camera, etc.

In a fifth exemplary embodiment according to the present invention, the accessory 200 may be a magnetic strip reader. The magnetic strip reader may function in a substantially similar manner to a credit card reader. That is, the accessory interface 210 of the magnetic strip reader may include a thin recess in which an object having the magnetic strip is swiped.

In a sixth exemplary embodiment according to the present invention, the accessory 200 may be smart card reader. The smart card reader may be used in conjunction with a smart card that includes embedded integrated circuits so that data may be exchanged. The smart card reader may be equipped to work with contact smart cards, contactless smart cards, or both. With reference to contact smart cards, the smart card reader may include electrical connectors that read data from the integrated circuit. With reference to contactless smart cards, the smart card reader may include radio frequency identification (RFID) reading components so that data is exchanged using RFID technology. Accordingly and more generally, the accessory 200 may be an RFID reader so that RFID tags may be read.

Figure 4B:
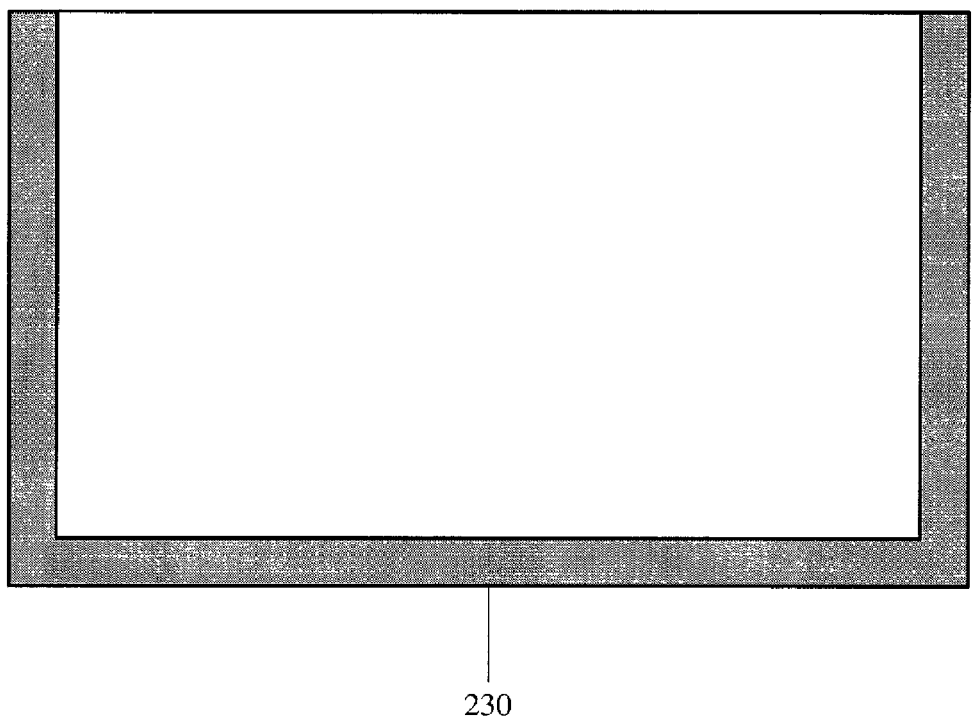
FIG. 4b shows exemplary components of the accessory of FIG. 4a according to an exemplary embodiment of the present invention.

FIG. 4b shows exemplary components of the accessory 200 of FIG. 4a according to an exemplary embodiment of the present invention. As discussed above, the accessory 200 may include magnets that couple to ferro-magnetic areas or oppositely polarized magnets disposed in the MU 100. Specifically, the accessory 200 may include an area 230 in which the magnets are disposed. As illustrated, the area 230 may substantially conform to the area 145 of the MU 100. Thus, when the accessory 200 couples to the MU 100, the area 230 may overlap the area 145. It should be noted that the magnets may be disposed in the entire area 230 or in predetermined areas of the area 230. When the magnets are disposed in predetermined areas of the area 230, it should be noted that the predetermined areas of the area 230 may coincide with the predetermined areas of the area 145 of the MU 100. It should also be noted that the MU 100 may include the magnets in the area 145 while the accessory 200 may include the ferromagnetic areas and/or oppositely polarized magnets in the area 230.

Figure 5A:
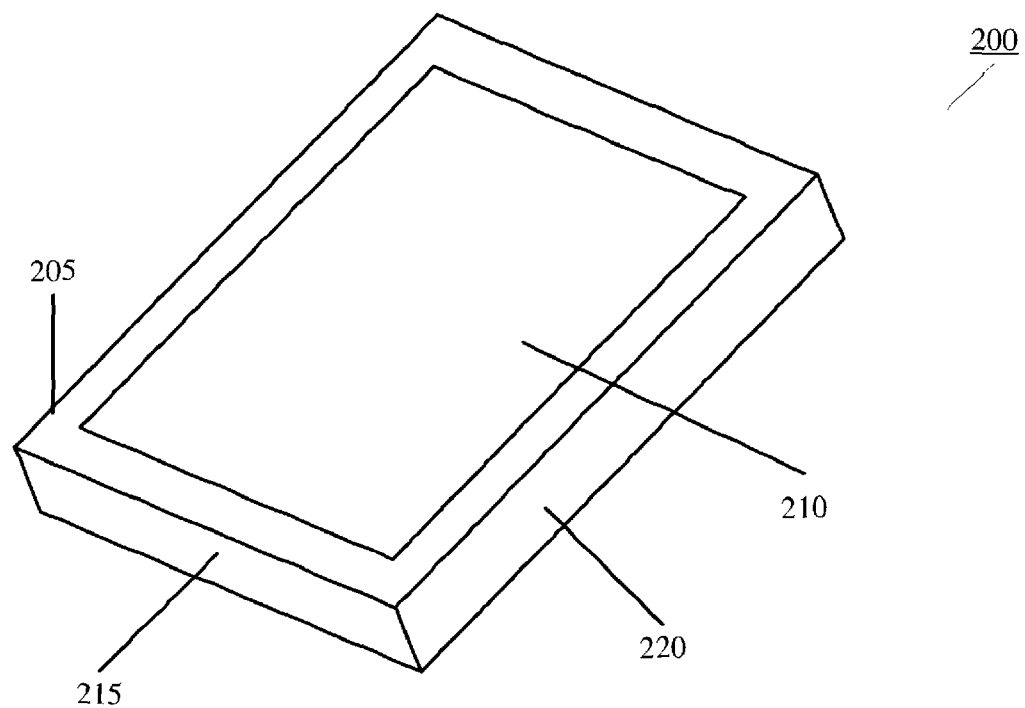
FIG. 5a shows a second view of the exemplary accessory of FIG. 4a according to an exemplary embodiment of the present invention.

FIG. 5a shows the exemplary embodiment of the accessory 200 of FIG. 4a according to the present invention. Specifically, the accessory 200 is shown at a first angled perspective view in which the accessory frame 205 and the accessory interface 210 may be seen. In addition, FIG. 5a shows a first side 215 and a second side 220. Specifically, the first side 215 may be a left side while the second side 220 may be a bottom side of the accessory 200.

Figure 5B:
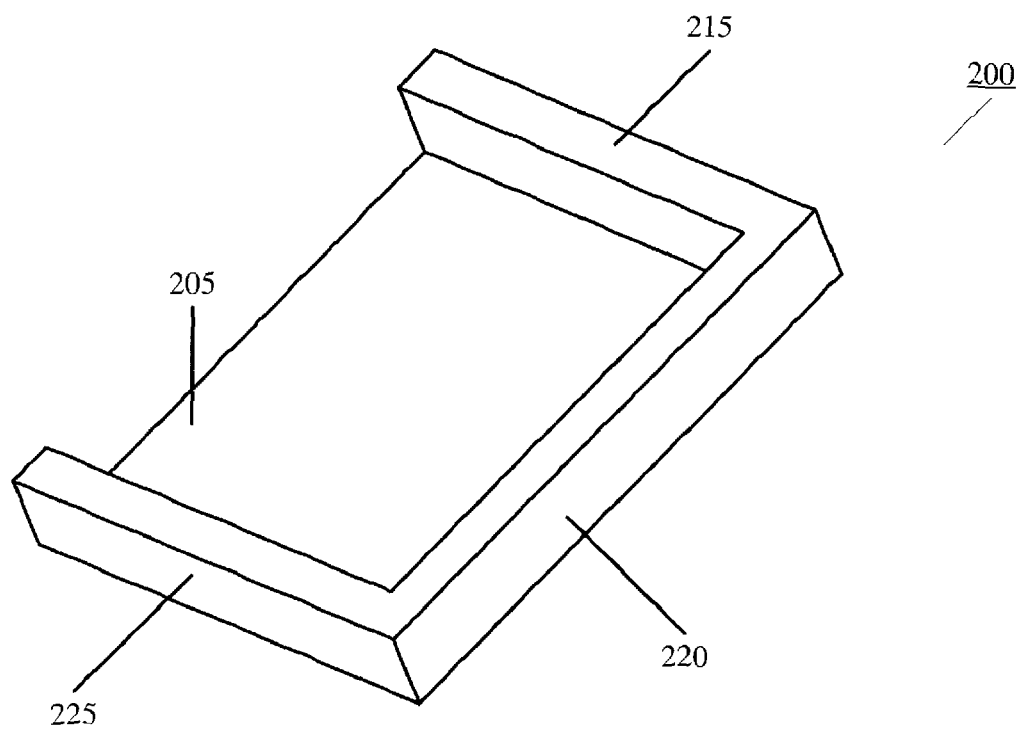
FIG. 5b shows a third view of the exemplary accessory of FIG. 4a according to an exemplary embodiment of the present invention.

FIG. 5b shows another exemplary embodiment of the accessory 200 of FIG. 4a according to an exemplary embodiment of the present invention. Specifically, the accessory 200 is shown at a second angled perspective view in which the accessory frame 205 may be seen but the accessory interface 210 may not be seen. That is, the accessory interface 210 is disposed on an opposite side of the face seen in FIG. 5b. In addition, FIG. 5b shows the first side 215, the second side 220, and a third side 225. Specifically, the third side 225 may be a right side of the accessory 200.

According to the exemplary embodiments of the present invention, the accessory 200 may exhibit a substantially rectangular solid with two faces that are missing where the two faces are substantially perpendicular to each other. In particular, a face opposite the side in which the accessory interface 210 is disposed and a face opposite the second side 220 are absent. As discussed above with reference to FIG. 4a, the interior of the accessory 200 may correspond to the frame 110 of the MU 100. That is, when the accessory 200 is coupled to the MU 100, a top end of the first side 215 may be adjacent to one of the substantially L-shaped indentation while the third side 225 may be adjacent to the other one of the substantially L-shaped indentation. Furthermore, the second side 220 may be adjacent to the bottom side of the MU 100. The accessory 200 may also cover a partial area of the display 115 when coupled. The coupled unit will be discussed in further detail below. Furthermore, as discussed above, because the frame 110 may include areas that are ferro-magnetic or include magnets, the accessory frame 205 may include magnets. In the exemplary embodiments, the magnets of the accessory 200 may be disposed at least partially within the first side 215, the second side 220, and the third side 225. However, it should be noted that the magnets of the accessory 200 may be disposed in any location that corresponds to the ferro-magnetic areas or the magnetic areas of the frame 110 of the MU 100.

Furthermore, with reference to FIG. 4b, the area 230 may encompass the first side 215, the second side 220, and the third side 225. Thus, the magnets may be disposed within the first side 215, the second side 220, and the third side 225. Therefore, when the accessory 200 couples to the MU 100, an interior face of the first side 215, the second side 220, and the third side 225 may be magnetized so that a magnetic coupling to the ferro-magnetic areas or oppositely polarized magnets disposed in the area 145 may be established.

It should be noted that the accessory 200 exhibiting the substantially rectangular solid shape with two missing faces is only exemplary. The accessory 200 may exhibit other shapes that enable a coupling of the accessory 200 to the MU 100. For example, the accessory 200 may exhibit a substantial bracket shape. In this example, the accessory 200 may couple to the MU 100 on any side of the frame 110. Furthermore, the frame 110 may encompass the entire housing 105 since the accessory 200 may not be limited to a bottom half of the MU 100. The substantial bracket shape may dispose the accessory 200 over three sides of the MU 100. In another example, the accessory 200 may exhibit a substantial L-shape. In this example, the accessory may also couple to the MU 100 on any side of the frame 110. Similar to the substantial bracket shape, the frame 110 may encompass the entire housing 105. However, the substantial L-shape may dispose the accessory 200 over two perpendicular sides of the MU 100. In yet another example, the accessory 200 may be a shaped substantially similar to a cradle. That is, the accessory 200 may be a substantially rectangular solid with one face missing so that a recess within the accessory 200 may receive the MU 100.

Figure 6:
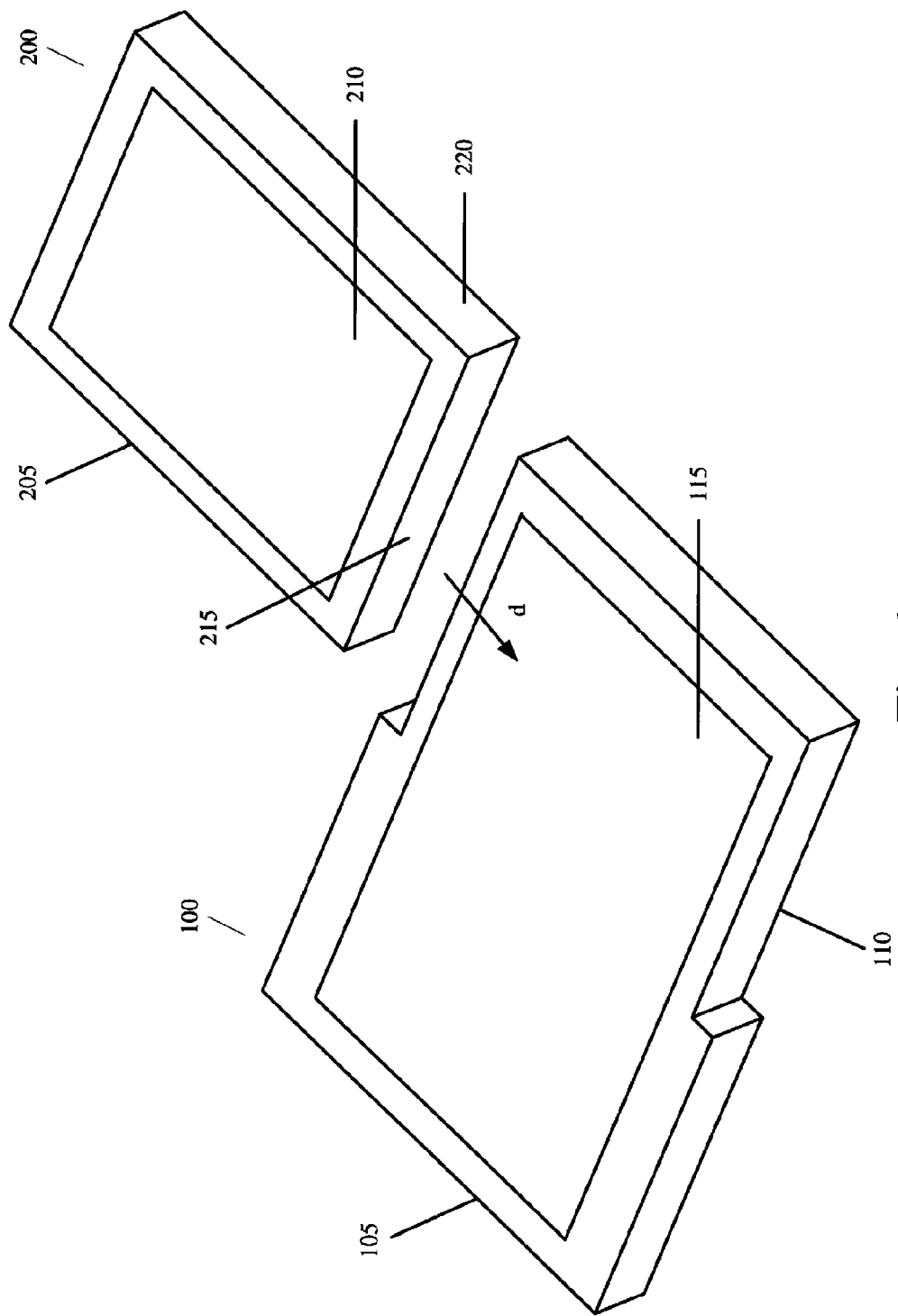
FIG. 6 shows an exploded view of the mobile unit of FIG. 1 with the accessory of FIG. 4a according to an exemplary embodiment of the present invention.

FIG. 6 shows an exploded view of the MU 100 of FIG. 1 with the accessory 200 of FIG. 4a according to an exemplary embodiment of the present invention. FIG. 6 illustrates that the MU 100 and the accessory 200 may couple by moving the accessory 200 in the direction d toward the MU 100. Upon coupling, the accessory 200 may be disposed over a bottom half of the MU 100. That is, the accessory 200 may be disposed over the frame 110 and the portion of the display 115 disposed between the frame 110.

Figure 7:
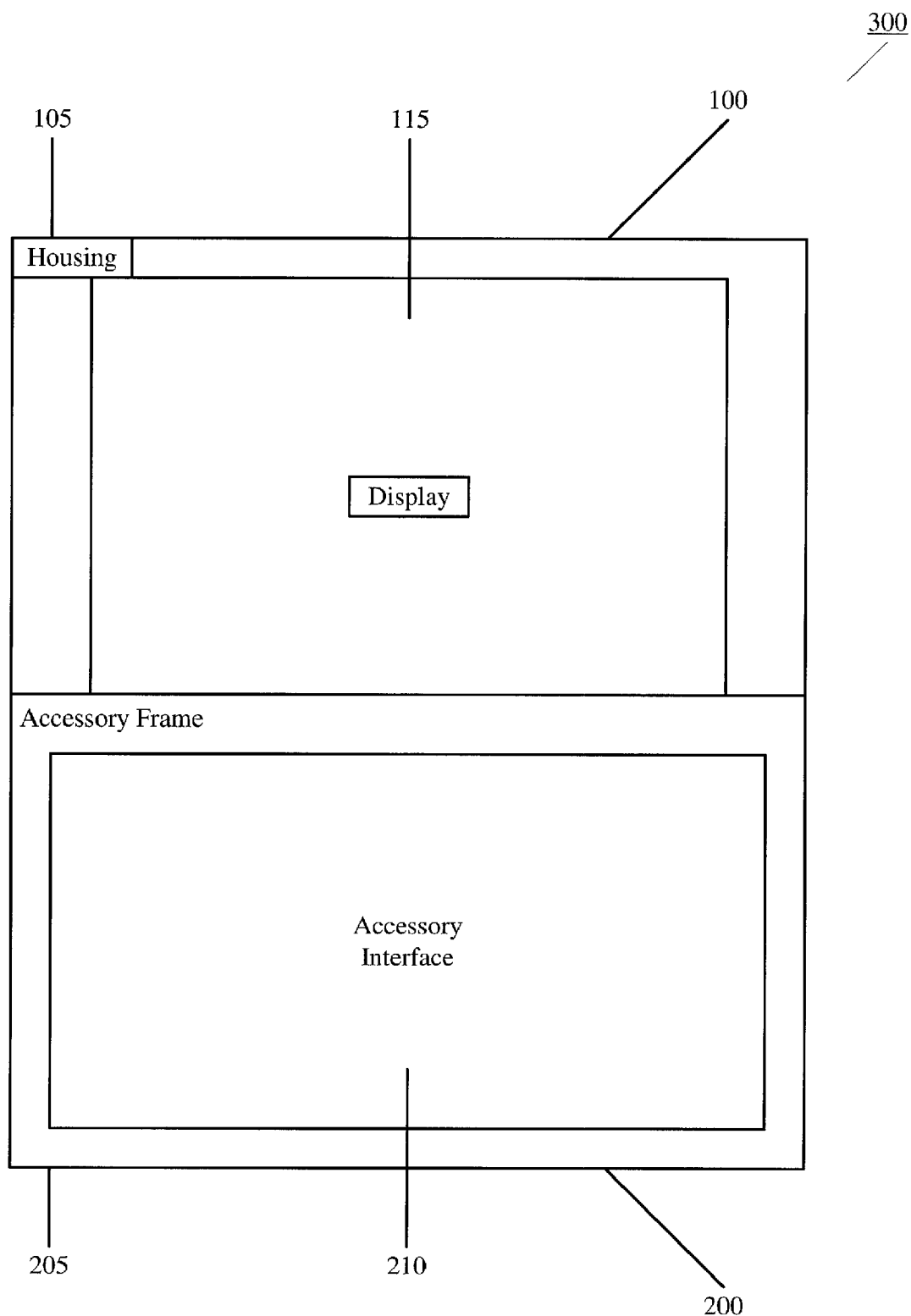
FIG. 7 shows a first assembled view of the mobile unit of FIG. 1 with the accessory of FIG. 4a according to an exemplary embodiment of the present invention.

FIG. 7 shows a first assembled view of the MU 100 of FIG. 1 with the accessory 200 of FIG. 4a according to an exemplary embodiment of the present invention. FIG. 7 illustrates a coupled unit when the accessory 200 is coupled to the MU 100 by moving in the direction d. As shown, the accessory 200 is disposed over a partial area of the display 115 and over the frame 110 which is no longer visible in FIG. 7. The substantially L-shaped indentations have been filled by the accessory 200. Furthermore, the sides of the accessory 200 and the sides of the housing 105 that is not the frame 110 create a flush overall side of the coupled unit. However, it should be noted that, as described above, the MU 100 may not include the substantially L-shaped indentations. In such an embodiment, the accessory 200 may extend past the side of the housing 105 that is not the frame 110. In addition, a length of the sides of the coupled unit may be greater than a length of the sides of the MU. Specifically, the length of the sides of the coupled unit are increased by a width of the second side 220 of the accessory 200. That is, the second side 220 is adjacent to the bottom side of the MU 100.

Figure 8:
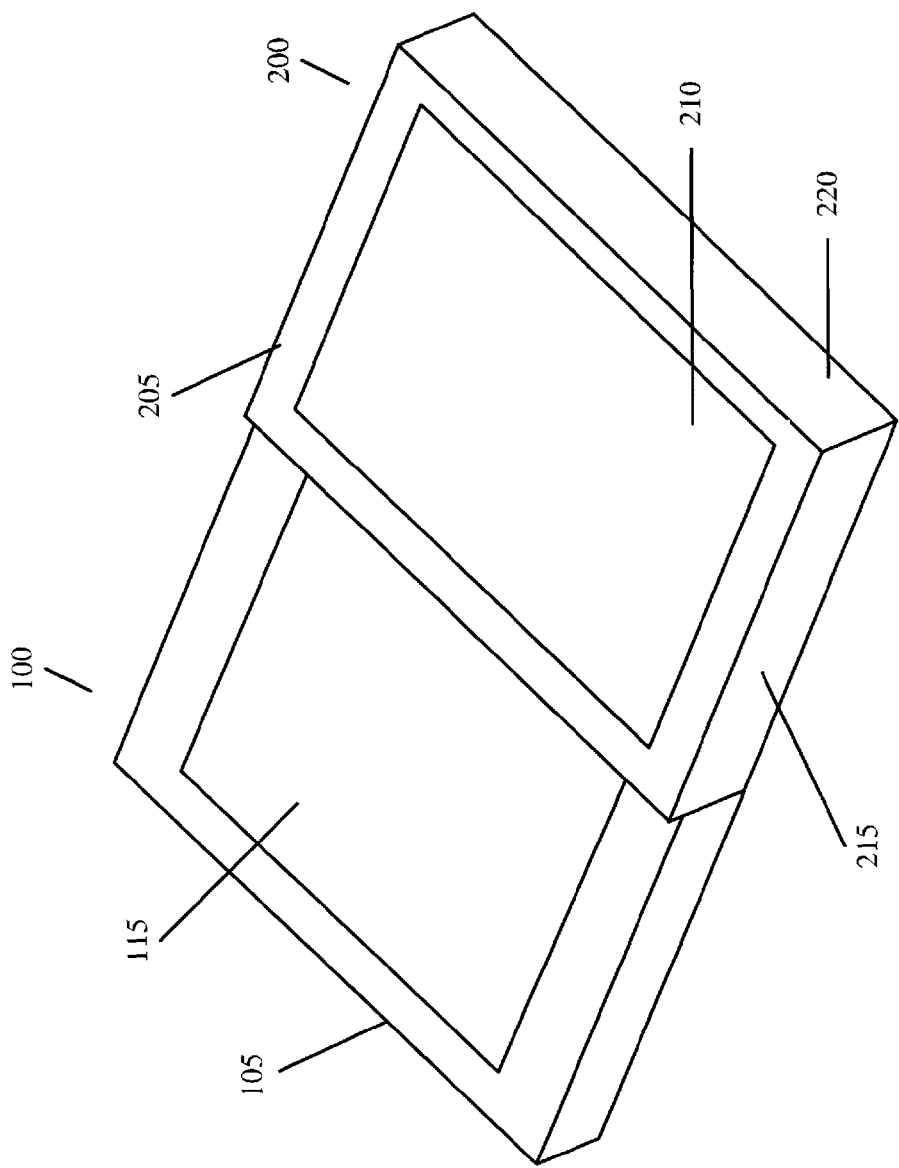
FIG. 8 shows a second assembled view of the mobile unit of FIG. 1 with the accessory of FIG. 4a according to an exemplary embodiment of the present invention.

FIG. 8 shows a second assembled view of the MU 100 of FIG. 1 with the accessory 200 of FIG. 4a according to an exemplary embodiment of the present invention. In particular, FIG. 8 shows an angled perspective view. As discussed above, the coupled unit has flush sides that include the sides of the housing 105 of the MU 100 and the first side 215 and the third side 225 of the accessory 200. The second assembled view also illustrates that the accessory 200 rises slightly above the MU 100. Because the MU 100 includes a flat display 115 and the accessory 200 is disposed over a partial area of the display 115, the accessory may include a portion that is above the MU 100. However, it should be noted that the MU 100 may include a substantially L-shaped indentation so that a coupling of the accessory 200 with the MU 100 may create an overall flush exterior for the coupled unit.

As discussed above, the coupling of the accessory 200 with the MU 100 includes a magnetic attraction between ferromagnetic areas of the frame 110 and magnets of the accessory frame 205 or between magnets of the frame 110 with oppositely polarized magnets of the accessory frame 205. The magnetic coupling of the accessory 200 to the MU 100 may also be used for an exchange of data and power signals therebetween. The magnets of either the MU 100, the accessory 200, or both may be equipped to ensure a correct alignment. For example, the oppositely polarized magnets do not repel against the magnets of the MU 100.

The magnetic coupling also establishes an inductive circuit coupling between the MU 100 and the accessory 200. The accessory 200 may include circuitry or other devices that require power to function. Some exemplary embodiments of the accessory 200 may also not include a respective portable power supply. The inductive circuit coupling may provide the necessary energy to power the accessory 200 utilizing the energy stored in the battery 130. Furthermore, the inductive circuit coupling may be used to exchange data signals between the accessory 200 and the MU 100. The exchange circuit 140 may be utilized for this function. The exchange circuit 140 may also detect a type of the accessory 200. That is, when the accessory 200 is coupled to the MU 100, the accessory 200 may exchange data and/or power signals that alerts the exchange circuit 140 to recognize a type that the accessory 200 is. In another exemplary embodiment, the magnets of the accessory 200 may be disposed at different locations so that the exchange circuit 140 may detect the magnet configuration to determine the type that the accessory 200 is.

Once the accessory 200 is powered and identified, the MU 100 may be configured with respect to the type of accessory. For example, the MU 100 may store data that associates a size of the accessory 200 with the identifying markers of the type. Because the accessory 200 may be disposed at least partially over a portion of the display 115, the MU 100 may configure the display 115 so that the covered portion is deactivated. In another example, the MU 100 may execute a program related to the accessory 200. In yet another example, the covered portion of the display 115 may be used to illuminate the interior side of the accessory 200. When the accessory 200 is a key pad, the keys may be lighted using the covered portion of the display 115 rather than equipping the accessory 200 with illuminating devices.

The coupling of the accessory 200 with the MU 100 (in particular with a display centric MU) enables users to purchase the MU 100 with less concern of utilizing accessories or purchasing an MU without certain functionalities. The coupling also enables current applications or operating systems to run and adapt with no interruption or interference as an automatic process is initiated when the accessory 200 is coupled to the MU 100. Furthermore, a need for connectors or ports to electrically connect the accessory to the MU are eliminated as the accessory magnetically couples to the MU.

It should be noted that the above described exemplary embodiments describe when a single accessory 200 couples to the MU 100. However, the use of a single accessory 200 is only exemplary. According to the present invention, the MU 100 may be equipped to couple to multiple accessories at different areas of the housing 105 and/or the frame 110. For example, a key pad may be coupled to the MU 100 as described above. A scanning module may be coupled to the MU 100 at another side of the MU 100 such as a top side. The MU 100 may automatically adjust for these multiple accessories coupling thereto as described above.

Furthermore, it should be noted that the above described exemplary embodiments showing that the MU 100 includes only a display is only exemplary. That is, the use of a display intensive MU is only exemplary. The MU 100 may include a key pad or other peripheral components. The accessory 200 may be coupled to the MU 100 to these types of MUs as well. For example, the MU 100 may include a number pad such as on a wireless communication phone. The number pad may enable entering of alphanumeric data through at least one input of a key. The accessory 200 may be an alphanumeric key pad that is disposed over the number pad to enable a user to enter alphanumeric data in a substantially similar manner as with a QWERTY key pad. In another example, the accessory may be a biometric pad that is placed over the key pad so that a fingerprint scan may be taken to initially authenticate a user. Subsequently, the biometric pad may be removed so that a user may utilize the MU 100.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A mobile unit, comprising:
a housing including a frame configured to mechanically align with an accessory using at least one magnet, when the frame and the accessory are aligned, data signals can be exchanged between the mobile unit and the accessory via a wireless coupling, and power can be exchanged between the mobile unit and the accessory via an inductive coupling;
a processor disposed within the housing processing the data signals and detecting the power being exchanged between the mobile unit and the accessory; and
a display disposed within the housing, wherein, when the accessory is coupled to the mobile unit, the processor automatically determines a type of the accessory as a function the amount of the exchange of power, and the accessory covers at least a portion of a viewable surface area of the display, and wherein the viewable surface area is automatically re-sized to be an uncovered area of the display.

2. The mobile unit of claim 1, wherein the magnets for alignment also provide the inductive coupling for the power exchange.

3. The mobile unit of claim 1, wherein the data signals are exchanged using capacitive coupling.

4. The mobile unit of claim 1, wherein the data signals are exchanged using optical coupling.

5. The mobile unit of claim 1, wherein the processor automatically determines a type of the accessory as a function of the amount of the exchange of power.

6. The mobile unit of claim 1, further comprising a display disposed within the housing, wherein, when the accessory is coupled to the mobile unit wherein the covered portion of the display is deactivated.

7. The mobile unit of claim 1, wherein the accessory is a key pad, and wherein the covered portion of the display serves as a backlight for the key pad.

8. An accessory for a mobile unit, comprising:
a housing configured to mechanically align to the mobile unit using at least one magnet, when the accessory and the mobile unit are aligned, data signals can be exchanged between the mobile unit and the accessory via a wireless coupling, and power can be exchanged between the mobile unit and the accessory via an inductive coupling, the accessory exchanging power with the mobile unit, which can be detected by the mobile unit; and
wherein, when the accessory is coupled to the mobile unit, the mobile unit automatically determines a type of the accessory as a function the amount of the exchange of power, and the accessory covers at least a portion of a viewable surface area of a display disposed within the housing of the mobile unit, and wherein the viewable surface area is automatically re-sized to be an uncovered area of the display.

9. A mobile system, comprising:
a mobile unit including a housing including a frame and a display disposed at least partially within the housing; and
at least one accessory capable of being mechanically aligned to the frame using at least one magnet, when the mobile unit and the accessory are aligned, data signals can be exchanged between the mobile unit and the accessory via a wireless coupling, and power can be exchanged between the mobile unit and the accessory via an inductive coupling, the accessory exchanging power with the mobile unit, which can be detected by the mobile unit; and a display disposed within the housing, wherein, when the accessory is coupled to the mobile unit, the mobile unit automatically determines a type of the accessory as a function the amount of the exchange of power, and the accessory covers at least a portion of a viewable surface area of the display, and wherein the viewable surface area is automatically re-sized to be an uncovered area of the display.

* * * * *